Sept. 11, 1962 F. TONNE 3,053,475
PNEUMATIC TUBE PLANT
Filed Oct. 27, 1958 2 Sheets-Sheet 1
FIG. 1
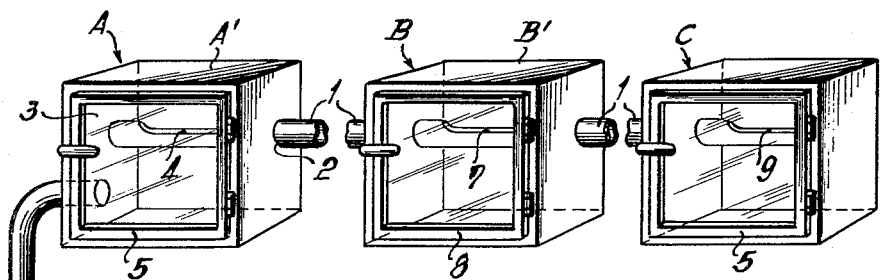
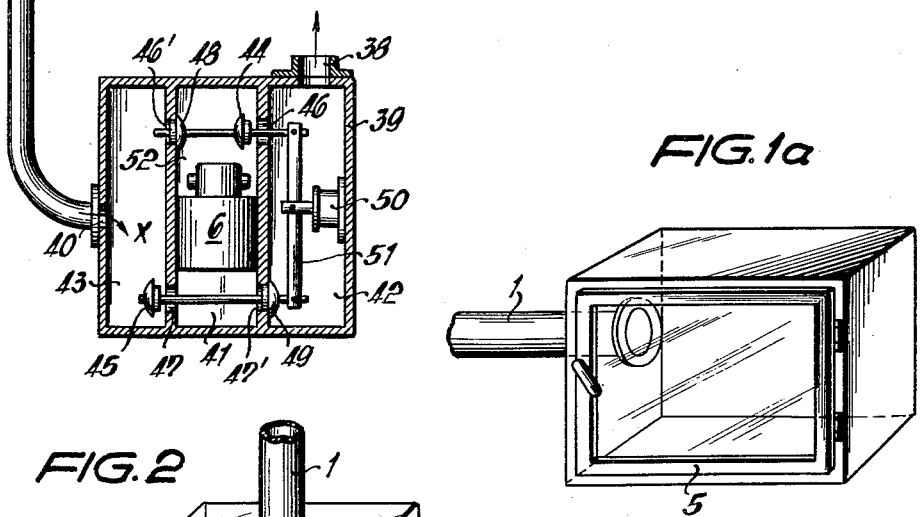
FIG. 1a
FIG. 2
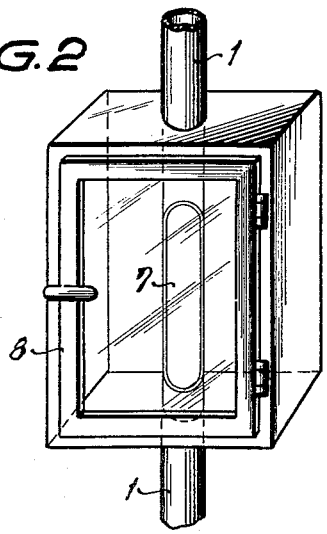
INVENTOR
Friedrich Tonne
By

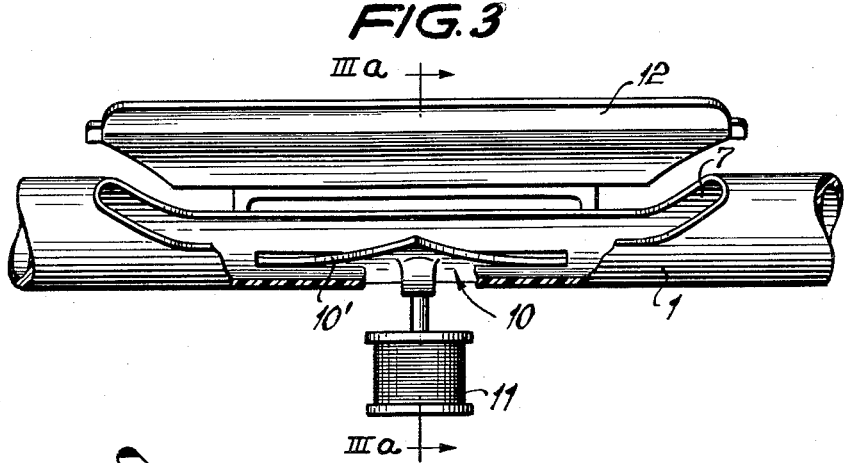
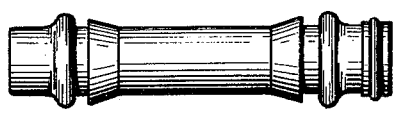
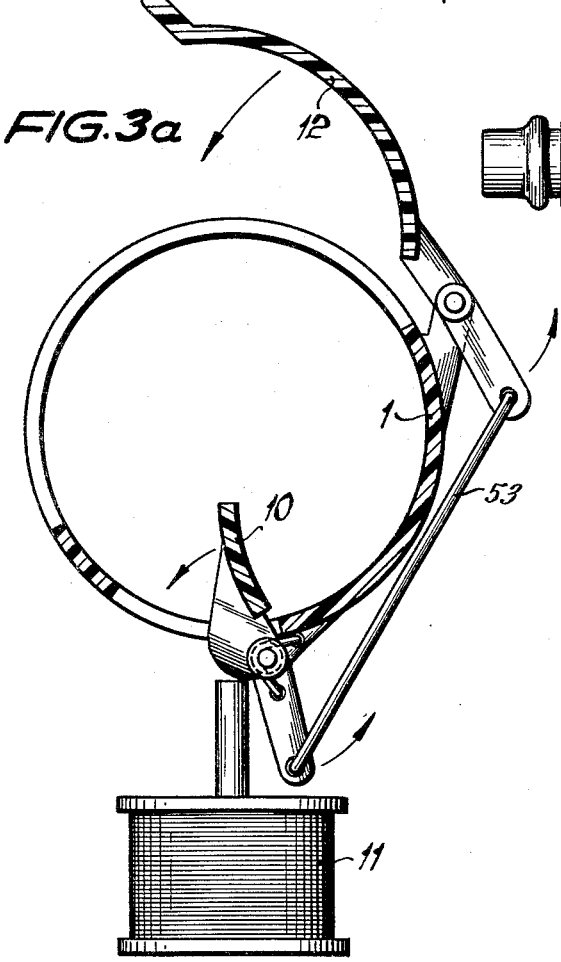

United States Patent Office 3,053,475
Patented Sept. 11, 1962

3,053,475
PNEUMATIC TUBE PLANT
Friedrich Tonne, Robert-Haug-Weg 11,
Stuttgart, Germany
Filed Oct. 27, 1958, Ser. No. 770,883
Claims priority, application Germany Oct. 25, 1957
14 Claims. (Cl. 243—16)

The present invention relates to pneumatic tube plants in which the container for the mail to be conveyed to the individual stations is passed through conveying pipes or tubes. With heretofore known pneumatic tube plants, the various stations are interconnected by conveying tubes while compressed air or suction are employed as conveying means, said compressed air or suction being produced by a blower, a piston pump or the like.

It is also known to employ a reversible blower so as to be able to employ pressure feeding or suction feeding. Such an arrangement makes it possible to reverse the transporting direction for the mail containers within the pneumatic tube plant. Pneumatic tube plants are known in which receiver stations operable in both conveying directions are designed as broadened portions of the tubes and are air-tight toward the outside, these broadened portions receive the mail container after the latter has left the respective conveying tube.

With pneumatic tube plants of this type, it is desirable to be able to exchange the mail, message or the like to be conveyed between any desired stations without requiring a rerouting by hand or machine so that when placing the respective conveying container into the tube system the final destination can be pre-selected and the respective container will be sent to the final destination without intermediate manual or mechanical removal from one tube and insertion into another tube.

A heretofore known pneumatic tube plant in which the above mentioned fundamental requirements are met has the drawback that the containers being conveyed through the tube system have at each station to pass through narrow curves. This fact causes a premature wear of the tubes and of the containers, and the system is rather noisy, and above all requires increased space. A further drawback of this heretofore known system consists in that the containers being inserted into the tube system will, depending on the transport direction, have to be charged at locally separated charging points. These separated charging points or openings require additional space and additional air-tight closures, and sometimes also additional electric contacts at the charging openings. Moreover, such a system requires considerable space.

It is, therefore, an object of the present invention to provide a pneumatic tube plant which will overcome the above mentioned drawbacks.

It is another object of this invention to provide a pneumatic tube plant which will make it possible to install any desired number of sub-stations, also after the plant has been completed, without requiring any major changes in the plant.

It is a still further object of this invention to provide a pneumatic tube plant as set forth in the two preceding paragraphs which is extremely simple and space-saving.

These and other objects and advantages of the invention will appear more clearly from the following specification in connection with the acompanying drawings, in which:

FIG. 1 is a diagrammatic representation of a portion of a pneumatic tube plant according to the invention with a horizontal arrangement of the main conveying tube with control means for guiding the air.

FIG. 1a shows another connection of the conveying tube with an end station.

FIG. 2 diagrammatically shows a part of a similar plant, however, the conveying tube leads in a vertical direction into a station container.

FIG. 3 illustrates the closure of the charging and receiving opening in connection with an ejector mechanism for a pneumatic tube system of the invention.

FIG. 3a is a section along the line IIIa—IIIa, of FIG. 3.

FIG. 4 is a diagrammatic illustration of a mail container.

General Arrangement

The pneumatic tube system according to the present invention is characterized primarily in that that portion of the conveying tube which leads into the station housing is rectilinear and is also designed to receive and discharge the mail or message container, while the conveying tube itself is provided with control means for automatically ejecting the container, and while further control means are provided for directing the respective container to so-called auxiliary tubes.

The tube portion which passes through the station container may be arranged horizontally or nearly horizontally, and in certain instances, may also be arranged vertically or nearly vertically. When the conveying tube passes horizontally through the station, the charging and discharging openings are, in conformity with the present invention, formed by a cutout preferably within the range of the upper half of the conveying tube.

When the conveying tube in the station container is approximately vertical, for purposes of closing the discharge and receiving openings of the conveying tube, the ejector mechanism has coupled thereto a closure for the receiving and discharging openings in such a way that, when the container passes through the station, the charging and discharging openings are at least partly closed and the closure is lifted off from the tube opening when the container is being discharged at the station. In order to obtain an automatic ejection of the container within the station, according to a further feature of the invention, stations through which the conveying tube passes in a rectilinear manner, are within the range of the discharging and charging openings of the conveying tube provided with an electrically or electromagnetically controlled ejector mechanism.

If the pneumatic tube plant according to the invention comprises also auxiliary conveying tubes in addition to the main conveying tubes, which auxiliary conveying tubes lead to substations, according to a further feature, so-called switches in form of tongues are provided. These switches are arranged where the auxiliary conveying tubes lead into the main conveying tube and have the purpose of selectively blocking or clearing the passage to or from the main conveying tube or the respective auxiliary tube. The control means are preferably actuated by electric contacts. For instance, as control means between the points where the auxiliary conveying tubes of a station lead into a main conveying tube, a simple shut-off mechanism in form of a slide, valve or the like may be provided which selectively blocks or clears the main conveying tube or auxiliary conveying tube.

Structural Arrangement

Referring now to the drawings in detail, FIG. 1 shows an end station A having directly connected thereto a blower 6 which may be arranged in the end station or, in conformity with FIG. 1, in a separate container. The end station A is, by means of a conveying tube 1, which latter may consist of transparent material, connected with an intermediate station B and a further end station C. End station A comprises a housing A' into which the conveying tube 1 leads through an air-tight connection 2. The conveying tube 1 which passes through the housing A' in a substantially horizontal position is, within said housing at the top or on the side provided with a discharge and charging opening 4. This opening 4 has associated therewith an ejector for ejecting the container for the mail, message or other means to be conveyed. The ejector will be described further below.

According to the embodiment shown in the drawing, the blower 6 (FIG. 1) is mounted in a casing 39 in such a way that the plant and, therefore, the interior 3 of the housing A' may by means of an electric control device 50 in casing 39 selectively be placed under pressure or under suction. Blower 6 is preferably separated from the housing A' of station A and communicates therewith through an air conduit 37. In order to make possible that with alternating direction of movement of the conveying container, the container may be moved selectively by pressure or by means of a suction effect, there is in conformity with the present invention provided a simple reversing device for the air current taken in by the blower. This control or reversing device comprises two pairs of valves coupled to each other which, depending on their position, connect the intake or suction side of the blower either with the opening 38 leading into the atmosphere and provided in casing 39, or with an opening 40 leading to the air conduit 37.

Blower casing 39 as illustrated by example in FIG. 1 has been sub-divided into four chambers 41, 42, 43 and 52. In the intermediate chambers 41 and 52 there is arranged the blower 6 having its intake or suction side directed downwardly and its outlet or pressure side directed upwardly. By means of the pairs of valves 44, 45, the openings 64 and 47, and by means of the valve pairs 46 and 49, the diametrically oppositely located openings 46' and 47' are opened respectively. All four valves are by means of a lever system 51 positively coupled to each other.

The outlet opening of blower 6 in the chamber 52 is, in the particular position shown in FIG. 1, through opening 46 in communication with the opening 38 leading into the atmosphere. Thus, air is drawn in through air conduit 37 in the direction shown by the arrow X and is blown toward the outside through opening 38.

When the valves 48 and 49 are open while the valves 44 and 45 are closed, the discharge opening in chamber 52 communicates with chamber 43 and thereby with the air conduit 37. The blower will then blow air into the pneumatic tube plant which will thus be under pressure, while air from the outside is drawn in by the blower through opening 38 and chamber 42 through opening 47'. A further essential feature of the invention consists in that the conveying tubes are passed through the stations, while the position of the tubes, in contrast to heretofore known plants, is rectilinear, and the arrangement itself is simple in structure and design. If, in conformity with the present invention, the opening 4 serves both as charging and discharging opening, and a conveying container is placed in tube 1 whereupon the door 5, which preferably is transparent, closes the housing A', the container will, by the creation of pressure in the interior 3 of housing A', be blown through tube 1 in the direction toward station B or C. That portion of the conveying tube 1, which passes through the intermediate station B likewise substantially horizontally, is provided with an opening 7. This opening, in conformity with the present invention, likewise serves both as charging and discharging opening. When door 8 pertaining to the housing B' of intermediate station B is closed, the container (shown in detail in FIG. 4) passes through intermediate station B further in the direction toward station C. If, however, the container was intended for station B, the sending station actuates electrically or electromagnetically the ejector of station B so that, when the container arrives at station B, the ejector of this station automatically ejects the container from the conveying tube 1 through the opening 7.

The ejector itself may be designed in the manner shown in FIG. 3. According to FIG. 3, the ejector 10 comprises a curved member 10' adapted to extend into the free passage of the conveying tube 1. When the ejector is actuated, i.e. is projected into the passage of the conveying tube 1, the oncoming container will slip up the curved surface of member 10', and since this surface is directed toward the opening 7 for instance in station B, the container will, when moving up said curved surface, be ejected through the opening 7. The ejector 10 is adapted to be actuated by an electromagnetic control device 11 which can be energized from any sending station. In conformity with the present invention, at least those stations between the end stations of the pneumatic tube plant are provided with an ejector of the above mentioned type.

When the conveying tube passes through a station in a vertical manner as shown in FIG. 2, the ejector 10 has mechanically connected therewith a closure 12 by means of a rod 52 (see FIG. 3a). This connection is such that, when the container passes through the respective station, closure 12 covers the discharge or charging opening of the conveying pipe at least partially. However, when the ejector, due to pre-selection by push button actuation, has been moved into its ejecting position, it projects into the free passage of the conveying tube 1. Simultaneously therewith, due to the operative connection of the ejector 10 with the closure 12, the closure is moved outwardly so as to release the charging and discharging opening. Thus, the ejector decreases the free passage of the conveying pipe 1 so that the container will jump out of the conveying tube 1 and will drop into the interior of the respective housing. It will then be observed through the transparent door 8 or a transparent portion thereof and can then be withdrawn from said housing whenever desired.

The section of conveying tube 1 within the end station C is likewise provided with an opening which is designated with the reference numeral 9 and located in the top surface of said tube section. This opening 9 likewise serves both as charging and discharging opening. With end stations, the ejector may be dispensed with if the conveying tube has an opening leading directly into the end station container (see FIG. 1a). This arrangement is simple and inexpensive. The actuation of blower 6 for pressure or suction may be effected electromagnetically from any of the stations. Similarly, the ejector of the intermediate stations may be made effective electromagnetically from any of the stations of the plant. The ejector mechanisms and the control of the blower for pressure and suction are preferably coupled to each other by multiple keys or relays. The running period of the blower as well as the period for which the ejector mechanism is made effective is advantageously determined by a timer. With the pneumatic tube system of the present invention, any desired number of intermediate stations may be connected to a conveying tube.

From the embodiment described above, it will be obvious that the main and auxiliary tubes may be arranged in any desired manner within a building. By making auxiliary tubes effective by means of switch tongues, it will be particularly simple also into an existing pneumatic plant additionally to build in one or more additional stations. The stations may be arranged at any desired height independent of the location of the main conveying tube. The arrangement of the main tubes according to the present invention as well as the arrangement of auxiliary tubes with switch control will save a considerable space. Furthermore, the wear of the container and the noise of operation will be considerably reduced inasmuch as the individual stations will be passed through by rectilinear tube sections only. The passages of the messages or the like will, therefore, be considerably accelerated whereby the sending frequency will be increased. A further material advantage of a pneumatic tube plant according to the invention consists in that the simple layout of the tube system and the reduced number of control means will considerably reduce the cost of manufacture of a pneumatic tube plant.

It is, of course, to be understood that the present invention is, by no means, limited to the particular construction and arrangement shown in the drawings but also comprises any modification within the scope of the appended claims.

What I claim is:

1. In combination in a pneumatic tube plant having a plurality of stations and a plurality of casings adapted selectively to be opened and closed and respectively pertaining to said stations for sending and receiving containers adapted to carry messages: a single conveying tube inter-connecting said casings and including straight sections extending into said casings, at least one of said casings being adapted to be closed in an air-tight manner, blower means communicating with said last mentioned casing, each of said straight sections having a single opening in the wall thereof in the pertaining casing for both receiving and discharging a message carrying container, and control means associated with said tube adjacent at least one of said openings and operable selectively to cause ejection of a message carrying container from said tube through an opening into the pertaining one of said casings or to allow the said container to continue on along the tube to another one of said casings, said control means being effective for ejecting containers in either direction of movement thereof in said tube.

2. An arrangement according to claim 1, in which said opening serving both as receiving and discharging opening is an elongated slot in the respective tube section, and said control means comprises an ejector in about the center of the slot.

3. An arrangement according to claim 2, in which at least one of said straight sections extends substantially in vertical direction through one of said casings and the said slot serving both as receiving and discharging opening therein extends in substantially vertical direction.

4. An arrangement according to claim 1, which includes a chamber connected between said blower and said casing adapted to be closed in an air-tight manner, and which also includes means selectively adjustable to connect said blower inlet or outlet to said chamber to create pressure above or below atmospheric pressure in said chamber.

5. In combination in a pneumatic tube plant having a plurality of stations and a plurality of casings adapted selectively to be opened and closed and respectively pertaining to said stations for sending and receiving containers adapted to carry messages: a conveying tube interconnecting said casings and including straight sections extending into said casings, at least one of said casings being adapted to be closed in an air-tight manner, blower means communicating with said last mentioned casing and being operable selectively to exert sub-atmospheric or above atmospheric pressure in said last mentioned casing for moving a message carrying container in either direction of said tube, said straight sections having an opening and the same opening for both receiving and discharging a message carrying container, ejector means movable selectively into said tube sections within said casings for ejecting a message carrying container therefrom, cover means respectively associated with said opening and normally at least nearly closing the same, said cover means being movable into an open positon to open the respective openings pertaining thereto, and coupling means respectively connecting the respective ejector means with the cover means pertaining thereto so as to move the respective cover means into open position when the ejector means pertaining thereto is being moved into position for ejecting a message carrying container and to move said cover means into closing position when said ejector means is being moved out of its ejecting position.

6. In combination in a pneumatic tube plant having a plurality of stations and a plurality of casings adapted selectively to be opened and closed and respectively pertaining to said stations for sending and receiving containers adapted to carry messages: a single conveying tube interconnecting said casings and including straight sections extending into said casings, at least one of said casings being adapted to be closed in an air-tight manner, blower means communicating with said last mentioned casing, said straight sections having a single and the same opening for both receiving and discharging a message carrying container, ejector means adjacent said openings movable selectively into said tube sections and operable when moved into the tube sections for ejecting a message carrying container through the opening into the pertaining casing, and electromagnetically operable means operatively connected to said ejector means for actuating the same into and out of the tube sections, said ejector means being effective for ejecting containers from the tube sections in either direction of movement of the containers in the conveying tube.

7. In combination in a pneumatic tube plant having a plurality of through stations and at least two end stations and a plurality of casings adapted selectively to be opened and closed and respectively pertaining to said through and end stations for sending and receiving containers adapted to carry messages: a single conveying tube freely extending into the interior of said end stations and also passing in straight line through said through stations, those portions of said conveying tube which extend through the casings of said through stations comprising a longitudinal slot serving both as receiving and discharging opening for a message-carrying container, blower means communicating with the casing pertaining to at least one end station for reversibly moving air along said conveying tube, and control means arranged adjacent said tube portions within the casings of said through stations and including an ejector operable when moved into the tube section to eject a message-carrying container in the respective tube section of a casing pertaining to a through station, through the said opening in the tube section into the casing or to allow said container to pass on to another one of said casings, said ejector comprising a cam on the opposite side of the tube section from the opening effective in either direction of movement of a container in the tube section to engage the container and eject the container through the opening.

8. In combination in a pneumatic tube plant having a plurality of stations and a plurality of casings adapted selectively to be opened and closed and respectively pertaining to said stations for sending and receiving containers adapted to carry messages: a single conveying tube interconnecting said casings and including straight sections extending into said casings, blower means having a suction side and a pressure side, a housing having a first opening leading into the atmosphere and having a second opening leading into one of said stations, valve means controlling said first and said second openings and operable selectively to connect said suction side with said first opening and said pressure side with said second opening or vice versa for selectively establishing a pressure or a suction effect in said housing and thereby in said last mentioned station, said straight sections having an opening and the same opening for both receiving and discharging a message-carrying container, and an ejector arranged adjacent said tube selectively movable into the tube on the side opposite said opening to engage and eject a message-carrying container moving in either direction in said tube means from the latter into one of said casings, and retractable from the tube to allow the said container to pass on past the opening to another one of said casings.

9. An arrangement according to claim 8, which includes electromagnetically operable means connected to said valve means for controlling the same.

10. In a pneumatic tube system for conveying message containers; a tube, a casing surrounding the tube forming a receiving and transmitting station, said casing having a door for gaining access to the interior of the casing and being large enough to receive a container outside the tube, said tube having a slot in the wall within the casing large enough to pass a container, means for reversibly moving air in the tube for moving message containers therein in either direction, and ejector means associated with the tube within the casing comprising an ejector cam movable into the tube at a point substantially diametrically opposite the center of said slot and operable when moved into the tube to eject a container moving in either direction along the tube through the said slot into the casing whereby retraction of the ejector cam following said ejection will leave the tube open for the passage of other containers along the tube past the said station, said ejector cam having a high point in the center and inclines extending downwardly therefrom on opposite sides so as to be equally effective in both directions of movement of containers in the tube.

11. In a pneumatic tube system for conveying message containers; a tube, a casing surrounding the tube forming a receiving and transmitting station, said casing having a door for gaining access to the interior of the casing and being large enough to receive a container outside the tube, said tube having a slot in the wall within the casing large enough to pass a container, means for reversibly moving air in the tube for moving message containers therein in either direction, and ejector means associated with the tube within the casing comprising an ejector cam movable into the tube at a point substantially diametrically opposite the center of said slot and operable when moved into the tube to eject a container moving in either direction along the tube through the said slot into the casing whereby retraction of the ejector cam following said ejection will leave the tube open for the passage of other containers along the tube past the said station, said ejector cam having a high point in the center and inclines extending downwardly therefrom on opposite sides so as to be equally effective in both directions of movement of containers in the tube, said ejector cam comprising a portion of the tube wall, and means pivotally supporting said ejector cam on the tube for movement of the ejector cam from a retracted position where it is coplanar with the tube wall into eject position where it projects into the tube.

12. In a pneumatic tube system for conveying message containers; a tube, a casing surrounding the tube forming a receiving and transmitting station, said casing having a door for gaining access to the interior of the casing and being large enough to receive a container outside the tube, said tube having a slot in the wall within the casing large enough to pass a container, means for reversibly moving air in the tube for moving message containers therein in either direction, ejector means associated with the tube within the casing comprising an ejector cam movable into the tube at a point substantially diametrically opposite the center of said slot and operable when moved into the tube to eject a container moving in either direction along the tube through the said slot into the casing whereby retraction of the ejector cam following said ejection will leave the tube open for the passage of other containers along the tube past the said station, said ejector cam having a high point in the center and inclines extending downwardly therefrom on opposite sides so as to be equally effective in both directions of movement of containers in the tube, said ejector cam comprising a position of the tube wall, and means pivotally supporting said ejector cam on the tube for movement of the ejector cam from a retracted position where it is coplanar with the tube wall into eject position where it projects into the tube, and electromagnetic actuator means connected to said ejector cam operable for moving the cam from one said positon thereof to the other.

13. A pneumatic tube system for conveying message containers according to claim 10 which includes means for actuating said ejector cam between ejecting and non-ejecting positions and adapted for remote operation.

14. A pneumatic tube system for conveying message containers according to claim 10 in which there is a second casing at one end of the tube, and said means for reversibly moving air to the tube comprising air moving means connected with said second casing.

References Cited in the file of this patent

UNITED STATES PATENTS

| | | |
|---|---|---|
| 523,456 | Bostedo | July 24, 1894 |
| 617,417 | Gillespie | Jan. 10, 1899 |
| 623,969 | Batcheller | May 2, 1899 |
| 1,107,547 | Pearsall | Aug. 18, 1914 |
| 1,660,293 | Cowley | Feb. 21, 1928 |
| 1,769,677 | Cowley | July 1, 1930 |
| 2,034,918 | Needham et al. | Mar. 24, 1936 |
| 2,698,721 | Van Otteren | Jan. 4, 1955 |